(12) United States Patent
Fan et al.

(10) Patent No.: US 9,579,602 B2
(45) Date of Patent: Feb. 28, 2017

(54) CATALYTIC $CO_2$ DESORPTION FOR ETHANOLAMINE BASED $CO_2$ CAPTURE TECHNOLOGIES

(71) Applicant: University of Wyoming, Laramie, WY (US)

(72) Inventors: Maohong Fan, Ames, IA (US); Abdulwahab Tuwati, Laramie, WY (US); Mohammed Assiri, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 125 days.

(21) Appl. No.: 14/632,974

(22) Filed: Feb. 26, 2015

(65) Prior Publication Data
US 2016/0250591 A1  Sep. 1, 2016

(51) Int. Cl.
*B01D 53/86* (2006.01)
*B01D 53/14* (2006.01)
*B01D 53/96* (2006.01)

(52) U.S. Cl.
CPC ..... *B01D 53/8671* (2013.01); *B01D 53/1425* (2013.01); *B01D 53/1475* (2013.01); *B01D 53/1493* (2013.01); *B01D 2252/2023* (2013.01); *B01D 2252/20484* (2013.01); *B01D 2252/20489* (2013.01); *B01D 2252/602* (2013.01); *B01D 2255/20707* (2013.01); *B01D 2255/20715* (2013.01); *B01D 2257/504* (2013.01); *B01D 2258/0283* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 4,523,981 | A | 6/1985 | Ang et al. |
| 4,595,465 | A | 6/1986 | Ang et al. |
| 4,620,906 | A | 11/1986 | Ang |

(Continued)

FOREIGN PATENT DOCUMENTS

| | | |
|---|---|---|
| CN | 102580569 A | 7/2012 |
| CN | 102614833 A | 8/2012 |

(Continued)

OTHER PUBLICATIONS

Samuel A. Tenney, et al., Key Structure-Property Relationships in CO2 Capture by Supported Alkanolamines, Journal of Physical Chemistry, 2014, 118, pp. 19252-19258.

(Continued)

*Primary Examiner* — Daniel Berns
(74) *Attorney, Agent, or Firm* — Patterson + Sheridan, LLP

(57) ABSTRACT

Embodiments described herein generally relate to apparatus and methods for reducing $CO_2$ from flue gas. Methods may include performing a chemisorption process in a first reactor comprising using at least a chemisorption solution comprising a sorbent. Methods may also include performing a desorption process treating the chemisorption solution with a powdered desorption catalyst after the chemisorption process has been performed.

10 Claims, 5 Drawing Sheets

(56) References Cited

U.S. PATENT DOCUMENTS

| | | | |
|---|---|---|---|
| 5,846,503 A * | 12/1998 | Yan | B01D 53/526 210/757 |
| 2009/0155889 A1 | 6/2009 | Handagama et al. | |
| 2012/0258029 A1 | 10/2012 | Krutka et al. | |
| 2012/0288429 A1 | 11/2012 | Fan | |
| 2013/0034481 A1 | 2/2013 | Dillon et al. | |
| 2014/0079612 A1 | 3/2014 | Krutka et al. | |
| 2014/0112856 A1 | 4/2014 | Krutka et al. | |
| 2014/0260966 A1 | 9/2014 | Dillon et al. | |
| 2014/0284521 A1 | 9/2014 | Deguchi et al. | |

FOREIGN PATENT DOCUMENTS

| | | |
|---|---|---|
| CN | 102872725 A | 1/2013 |
| CN | 103861424 A | 6/2014 |
| WO | 2012/033986 A2 | 3/2012 |
| WO | 2012/093853 A2 | 7/2012 |
| WO | 2013/065880 A1 | 5/2013 |
| WO | 2014/000113 A1 | 1/2014 |

OTHER PUBLICATIONS

Tong Jin, et al. Photocatalytic CO2 Reduction using a Molecular Cobalt Complex Deposited on TiO2 Nanoparticles, Chem. Commun., 2014, 50, pp. 6221-6224.

Li Shuhong, et al., Interface Absorption Characteristics of CO2 in TiO2—MDEA-H2O Nanofluids, Journal of Southeast University, Natural Science Edition, Nov. 2013, vol. 43, No. 6, 5 pp.

Li Shuhong, et al., Measurement of Thermophysical Properties of TiO2-MDEA-H2O Nanofluids, Journal of Jiangsu University, Natural Science Edition, Sep. 2013, vol. 34, No. 5, 5 pp.

Li Shuhong, et al., CO2 Bubble Absorption Performance Enhancement by TiO2 Nanoparticles in MDEA Solution, Journal of Southeast University, Natural Science Edition, Jul. 2013, vol. 43, No. 4, 5 pp.

Fujiao Songa, et al., Capture of Carbon Dioxide by Amine-loaded as-synthesized TiO2 Nanotubes, Environmental Technology, 2013, vol. 34, No. 11, pp. 1405-1410.

Fujiao Songa, et al., Capture of Carbon Dioxide from Flue Gases by Amine-functionalized TiO2; Nanotubes, Applied Surface Science 268 (2013) pp. 124-128.

Hung-Yu Wu, et al., Metal-doped Photocatalysts to Reduce Carbon Dioxide in Ethanolamine Solution for; Methane Production, Technical Proceedings of the 2012 NSTI Nanotechnology Conference and Expo, NSTI-Nanotech 2012, pp. 746-748.

Chien-Lin Tseng, et al., 2-Ethanolamine on TiO2 Investigated by in Situ Infrared Spectroscopy. Adsorption, Photochemistry, and Its Interaction with CO2, J. Phys Chem C 2010, 114, pp. 11835-11843.

Kathrin Muller, et al., Monoethanolamine Adsorption on TiO2(110): Bonding, Structure, and Implications for Use as a Model Solid-Supported CO2 Capture Material, J. Phys. Chem. C, 2014, 118, pp. 1576-1586.

\* cited by examiner

CATALYTIC CO$_2$ DESORPTION FOR ETHANOLAMINE BASED CO$_2$ CAPTURE TECHNOLOGIES

FIELD

Embodiments disclosed herein generally relate to CO$_2$ chemisorption and desorption.

BACKGROUND

Climate change is one of the most serious challenges societies are currently facing. The amount of greenhouse gases emitted to the atmosphere has increased substantially, and the amount will continue to increase in the foreseeable future. One of the major greenhouse gases is carbon dioxide (CO$_2$) due to the use of fossil fuels (oil, natural gas, and coal), solid waste, trees and wood products, and also as a result of chemical manufacturing. The high demand for fossil fuel, which meets more than 98% of the world's energy needs, is largely responsible for the increase in the CO$_2$ concentration levels in the atmosphere. The atmospheric CO$_2$ concentration has risen to ~280-390 ppm, which is an approximately 35% increase compared to atmospheric CO$_2$ levels at the beginning of the industrial revolution. It is projected that atmospheric CO$_2$ concentration will continue to increase unless effective CO$_2$ emission control measures are taken.

Capturing CO$_2$ emitted from power station flue gas has been considered to be a potentially effective approach to control atmospheric CO$_2$ levels. Researchers have studied different methods for capturing CO$_2$ in flue gas, such as cryogenic fractionation, membrane separation, and chemisorptions.

Industries are increasingly interested in the use of chemisorptions in particular for the separation of CO$_2$ from flue gas because chemisorptions have been widely considered to be able to reduce energy consumption needed for separation of CO$_2$ from flue gas. Chemisorptions may be performed via absorption or adsorption.

Adsorbents used for adsorption-based chemisorption processes include K$_2$CO$_3$ or Na$_2$CO$_3$, each supported on a nanoporous TiO(OH)$_2$ support. K$_2$CO$_3$ supported on nanoporous TiO(OH)$_2$ has been shown to increase CO$_2$ sorption capacity per unit of K$_2$CO$_3$ compared to K$_2$CO$_3$ alone. Nanoporous TiO$_2$ has also been shown to be a potent CO$_2$ adsorbent. Macroporous TiO$_2$ physically impregnated with monoethanolamine has also been shown as a potent adsorbent. Adsorption under the aforementioned conditions, however, may require increase of pressure in a range of 5-35 bar and decrease in temperature of the system within a range of 25-125° C. Furthermore, adsorbed CO$_2$ must then be released from the sorbent, a process known as desorption, so that the sorbents may be reused. Desorption processes with sorbents K$_2$CO$_3$ and Na$_2$CO$_3$, each supported on a nanoporous TiO(OH)$_2$ support, require high temperatures and/or high pressures of a gas introduced into the desorption system. Na$_2$CO$_3$ on nanoporous FeOOH has also been shown to be a potential CO$_2$ adsorption/desorption system. However, CO$_2$ adsorption/desorption capacity and kinetics associated with use of Na$_2$CO$_3$ is a concern for any industrial scale-up of carbonate-related CO$_2$ adsorption/desorption processes. Furthermore, because alkali metal carbonate adsorbents involve a proton transfer mechanism, the activation energy required for the corresponding desorption/regeneration processes using alkali metal carbonates is indeed a bottleneck for industrial scale-up of these processes.

Other potassium-based adsorbents, such as K$_2$CO$_3$/activated carbon (AC), K$_2$CO$_3$/TiO$_2$, K$_2$CO$_3$/Al$_2$O$_3$, K$_2$CO$_3$/MgO, and K$_2$CO$_3$/zeolite, have also been used for CO$_2$ adsorption. These potassium-based adsorbents are regenerable to some extent and have shown high CO$_2$ capture capacity. However, K$_2$CO$_3$/Al$_2$O$_3$ and K$_2$CO$_3$/MgO, in particular, have shown poor regeneration abilities. In other words, the CO$_2$ adsorption capacities of K$_2$CO$_3$/Al$_2$O$_3$ and K$_2$CO$_3$/MgO decrease considerably after a few cycles of CO$_2$ adsorption/desorption, at temperatures lower than 200° C. With some potassium-based sorbents, temperatures as high as 350-400° C. may be necessary for complete CO$_2$ desorption, however, doing so may decompose the chemical structure of the original sorbents.

Alternatively, absorption generally uses aqueous alkanolamine compounds [e.g., monoethanolamine (MEA)] as CO$_2$ sorbents. MEA-based CO$_2$ absorption allows capture of CO$_2$ in, for example, natural gas. MEA on TiO$_2$ solid support has been shown to be a potent absorbent with desorption temperatures of 90° C. Nonetheless, scale up of such an absorption process may be economically unfeasible because the energy consumptions associated with the absorption and desorption are too demanding. The energy consumptions are demanding because of the dilute CO$_2$ characteristics of flue gas and because the amine solutions are aqueous. Aqueous solutions of amine absorbents are typically required for CO$_2$ separation because of the corrosiveness of the amines. However, the presence of water of the solutions requires more energy input during, for example, desorption due to the high specific-heat-capacity and latent heat of vaporization of water. Indeed, typical amine solutions used by the natural gas industry for absorption processes may contain about 70 wt % water. Furthermore, demanding energy input during the CO$_2$ desorption is also due to the very slow kinetics of CO$_2$ removal from the sorbent(s). However, amine sorbents may not be thermally stable. Furthermore, amine sorbents may vaporize at the required desorption temperatures, unlike the alkali carbonate adsorbents described above. The aforementioned bottlenecks of desorption processes renders current absorption/desorption technologies uneconomical for industrial scale-up. Thus, there is a need in the art for enhanced CO$_2$ desorption technologies and combination sorption/desorption technologies.

SUMMARY

Embodiments described herein generally relate to methods for reducing CO$_2$ from flue gas. In one embodiment, a method of reducing CO$_2$ from flue gas comprises performing a chemisorption process in a reactor comprising using at least a chemisorption solution having a sorbent. The method further comprises performing a desorption process by treating the chemisorption solution with a powdered desorption catalyst after the chemisorption process has been performed.

In another embodiment, an apparatus for performing chemisorption and desorption processes comprises a chemisorption reactor configured to perform a chemisorption process. The apparatus includes a first conduit coupled with the chemisorption reactor at a first end and a desorption reactor at a second end. The first conduit is configured to transport CO$_2$-rich sorbent to the desorption reactor, and the desorption reactor is configured to perform a desorption process. The apparatus may further include a reflux condenser coupled with the desorption reactor at a first end. The apparatus may further include a second conduit coupled with the desorption reactor at a first end and the chemisorption reactor at a second end. The second conduit is configured to transport regenerated sorbent to the chemisorption reactor, and a controller configured to control the apparatus for performing chemisorption and desorption processes.

In another embodiment, a non-transitory computer-readable medium storing instructions that, when executed by a processor, cause a computer system to control an apparatus for performing chemisorption and desorption processes. The non-transitory computer-readable medium causes the computer system to control the apparatus by performing the steps of performing a chemisorption process in a first reactor comprising using at least a chemisorption solution comprising a sorbent, and performing a desorption process by treating the chemisorption solution with a powdered desorption catalyst after the chemisorption process is performed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this present disclosure and are therefore not to be considered limiting of its scope, for the present disclosure may admit to other equally effective embodiments.

Figure 1A:
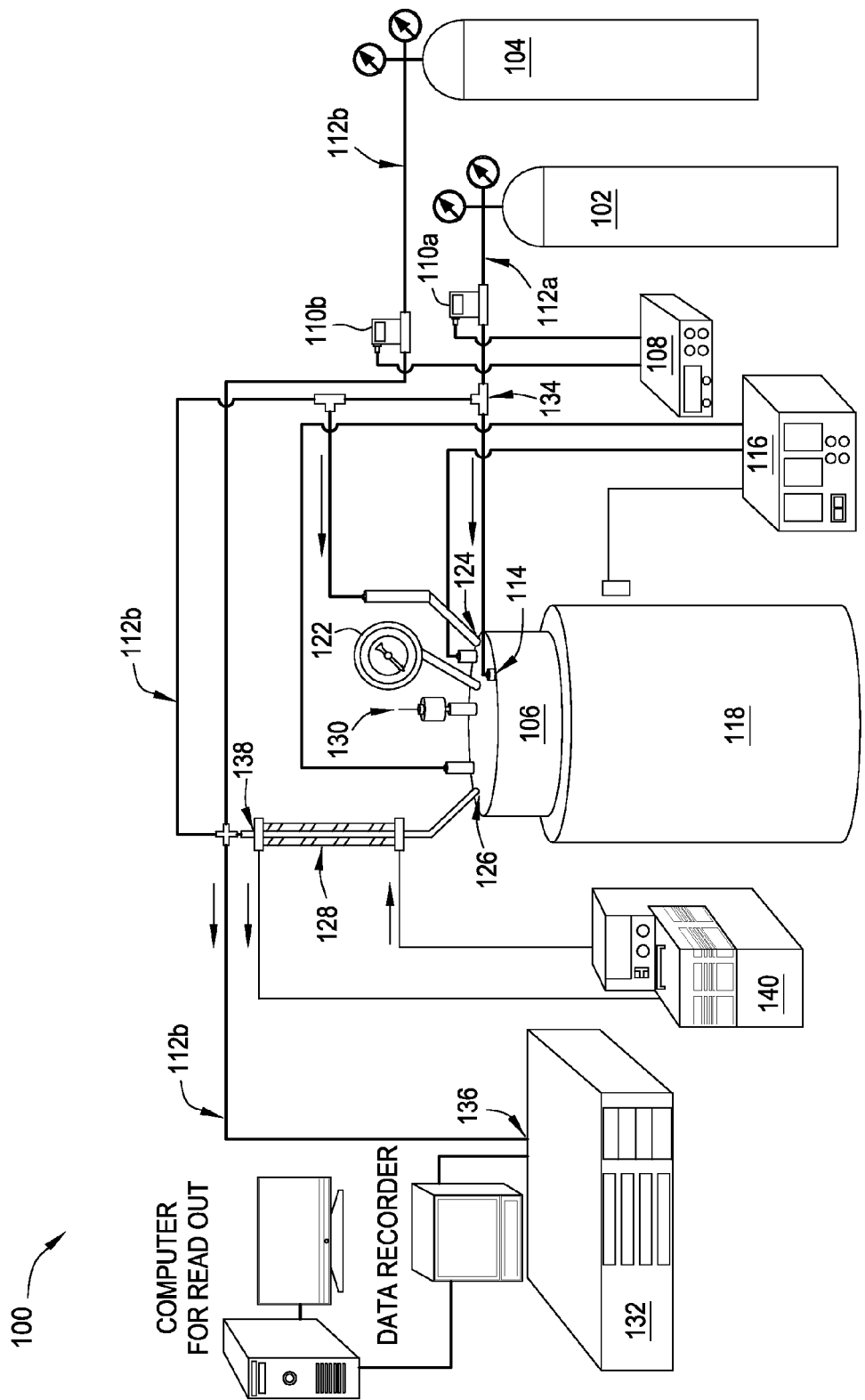
FIG. 1A is a schematic view of an apparatus for chemical absorption/desorption of $CO_2$ according to an embodiment.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments described herein generally relate to methods, apparatus, and systems for reducing $CO_2$ from flue gas. The methods generally comprise a process of reducing $CO_2$ from flue gas comprising performing a chemisorption process in a reactor comprising using at least a chemisorption solution having a sorbent. The methods generally comprise further performing a desorption process by introducing a powdered desorption catalyst into the chemisorption solution after the chemisorption process has been performed. The apparatus generally comprises a chemisorption reactor configured to perform a chemisorption process and a desorption reactor configured to perform a desorption process. The non-transitory computer-readable medium generally comprises storing instructions that, when executed by a processor, cause a computer system to control an apparatus for performing chemisorption and desorption processes.

FIG. 1A is a schematic view of an apparatus 100 for chemical absorption/desorption of $CO_2$ according to an embodiment of the present disclosure. The apparatus 100 includes a first cylinder 102 for housing a first process gas, such as $CO_2$. The apparatus 100 includes a second cylinder 104 for housing a second process gas, such as a carrier gas. A flow controller 108, coupled to mass flow sensors 110a and 110b, controls the flow rate of process gases to reactor 106 via flow channels 112a, 112b and gas inlet 114. Reactor 106 may be a stainless steel reactor. The flow controller 108 may be a Parr A2200E, or any other suitably configured flow controller for controlling the flow rate of process gases. Flow channel 112a is coupled with cylinder 102 at a first end and coupled with gas inlet 114 at a second end. Flow channel 112b is coupled with second cylinder 104 at a first end and coupled with flow channel 112a at a second end 134, gas analyzer 132 at a third end 136, and reflux condenser 128 at a fourth end 138. Mass flow sensor 110a may be configured to detect process gas from cylinder 102 and mass flow sensor 110b may be configured to detect process gas from cylinder 104. The mass flow sensors are in electronic communication with flow controller 108. After receiving a signal from mass flow sensor 110a and/or mass flow sensor 110b, flow controller 108 may determine a concentration of each process gas and control adjustment of flow rates of the respective process gases by electronically communicating to mass flow sensor 110a and/or mass flow sensor 110b to either increase, decrease and/or hold constant a particular flow rate of process gas.

Because flow channel 112a is coupled with flow channel 112b at a second end 134, a process gas within flow channel 112b enters flow channel 112a and mixes with $CO_2$ gas within flow channel 112a, forming a gas mixture. In an absorption/desorption process, the gas mixture may be, for example, from about 1% to 100% $CO_2$ and from about 1% to 100% carrier gas. The carrier gas may include $N_2$, He, $H_2$, $CO_2$, Argon and mixtures thereof. The gas mixture may enter reactor 106 via gas inlet 114. A solution comprising a concentration of one or more sorbents may be disposed within the reactor. For industrial scale-up of methods described herein, a reactor similar to reactor 106 may be larger than reactor 106. The sorbents may be adsorbents or absorbents. The sorbent solution may be introduced into the reactor via solution inlet 124.

The one or more sorbents may be one or more alkanolamines. The one or more alkanolamines may be selected from the group comprising monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol, or mixtures thereof. The solution may be aqueous. The amount of water of an aqueous solution for the methods described herein may be from about 100 mL to about 2000 mL, such as 900 mL, (for the processes of FIG. 1) to as much as required for a particular industrial scale-up for absorbing/desorbing $CO_2$ from flue gases (described in more detail below).

A reactor controller 116 is coupled with the reactor 106 via a thermocouple at a first end and coupled with a furnace 118 at a second end. The reactor controller 116 may monitor the temperature of the reactor during an absorption/desorption process and adjust a processing temperature by electronic communication with furnace 118. The temperature of an absorption process may be from about 10° C. to about 100° C., such as about 20° C. to about 65° C., such as about 35° C. The temperature of a desorption process may be from about 10° C. to about 90° C., such as about 35° C. to about 75° C., such as about 35° C. Reactor controller unit 116 may also monitor the pressure inside of reactor 106, and the pressure reading may be displayed on the reactor 106 and/or a pressure gauge 122. Reactor controller 116 may be a Parr 4848, but it is understood that any other suitably configured reactor controller unit may also be used for monitoring pressure during absorption/desorption.

Outlet 126 may be used for carrying process gases out of reactor 106 to gas analyzer 132 for quantitative and/or qualitative measurement. Outlet 126 may be coupled with a reflux condenser 128. Reflux condenser 128 may condense vapor, such as water vapor, emitted from reactor 106 and return the condensed water vapor to reactor 106 so that the volume of a solution for a process within reactor 106 remains constant. Reflux condenser 128 may be coupled to a temperature chiller unit 140 to assist in the condensation of vapor. A mechanical stirrer 130 may be coupled with reactor 106 to mix a solution within reactor 106. Mechanical stirrer 130 may be coupled with reactor controller unit 116. Mechanical stirrer 130 may stir a solution within reactor 106 at a mix rate of about 100 rpm to about 1000 rpm, such as about 500 rpm to about 700 rpm. It is envisioned, however, that stir rates may be adjusted for industrial scale-up of the methods described herein (described in more detail below).

In one embodiment, as a proof of principle absorption process, 900 mL of deionized water may be placed into reactor 106 and heated to 25° C. 1% $CO_2$ in 99% $N_2$ is injected into the water at inlet 114 at a flow rate of 500 mL/min and a solution mixing rate of 500 rpm until the water is saturated with $CO_2$. A 2.05M solution of ethanolamine is added to reactor 106 via solution inlet 124. The amount of $CO_2$ absorbed during the process may be measured via a gas analyzer, for example, once per second and recorded with a data chart recorder, such as a Monarch 2000, until the absorption reaction is completed. The absorption reaction may be deemed completed when the concentration of $CO_2$ at inlet 114 (as determined by flow controller 108) equals the concentration of $CO_2$ at outlet (as determined by gas analyzer 132).

In one embodiment, following an absorption/adsorption process, both inlet and outlet valves of reactor 106 are closed in order to prevent escape of $CO_2$ after an absorption/adsorption process is completed, determined as described above. The solution within the reactor 106 may then be heated to a temperature between about 10° C. to about 90° C., such as between about 25° C. to about 65° C., for example, about 35° C. A powdered desorption catalyst may then be added to reactor 106 via, for example, inlet 124, followed by opening of inlet and outlet valves of reactor 106. The powdered desorption catalyst may be added to reactor 106 in powder form, as a solution or as a slurry. The powdered desorption catalyst may be a catalyst of the formula: $MZ_v$, wherein Z is selected from the group comprising $-SO_4^-$, $-F$, $-Cl$, $-Br$, $-I$ and $-O_x(OH)_y$, wherein $2x+y=4$, wherein M is selected from the group comprising Ti, Zr and Hf, and wherein v is a numeral from 1 to 4. For example, the powdered desorption catalyst may be $TiO_2$, $Ti(OH)_4$, $TiO(OH)_2$ and/or mixtures thereof. A carrier gas may be passed through reactor 106 via inlet 114 to facilitate desorbed $CO_2$ measurement by gas analyzer 132. For example, regarding reactor 106, a flow rate of a carrier gas may be about 100 mL/min to about 1000 mL/min, such as about 500 mL/min. It is envisioned, however, that a carrier gas may not be desired in, for example, an industrial scale-up of methods described herein. If a carrier gas is used in an industrial scale-up of methods described herein, it is to be understood that the flow rates of the carrier gas and $CO_2$ gas may be adjusted and still fall within the scope of the methods described herein (as described in more detail below).

Figure 1B:
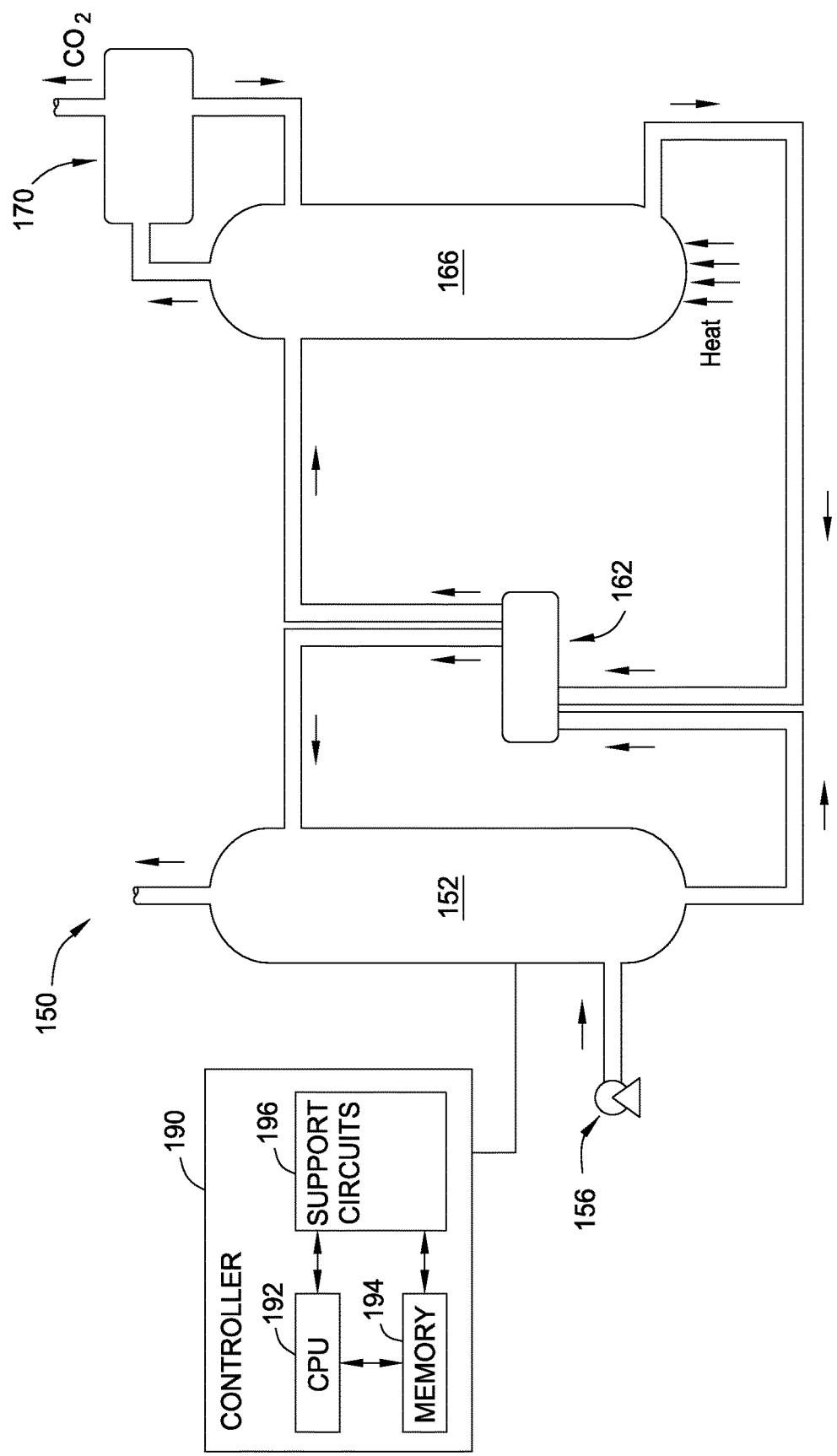
FIG. 1B is a schematic view of an apparatus for industrial scale-up chemical absorption/desorption of $CO_2$ according to an embodiment.

FIG. 1B is a schematic view of an apparatus 150 for industrial scale-up chemical absorption/desorption of $CO_2$ according to an embodiment of the present disclosure. As shown in FIG. 1B, apparatus 150 comprises chemisorption reactor 152 containing a chemisorption solution. The chemisorption solution may contain a sorbent at a concentration from about 1 μM to about 10 M, about 8 mM to about 500 mM, about 40 mM. The sorbent may be MEA. A $CO_2$-rich gas stream, such as flue gas, may be introduced into reactor 152 via a conduit. The $CO_2$-rich gas stream may be flowed through a conduit by compressor 156. Once the $CO_2$-rich gas stream is introduced into chemisorption reactor 152, a chemisorption process may be performed. A carrier gas along with the $CO_2$-rich gas may be introduced into chemisorption reactor 152 (via a conduit or another conduit (not shown)) at a flow rate from about 100 m$^3$/min to about 50,000 m$^3$/min, such as about 10,000 m$^3$/min to about 20,000 m$^3$/min, about 15,000 m$^3$/min. Flow rates of $CO_2$-rich gas into chemisorption reactor 152 may be from about 1,000 m$^3$/min to about 50,000 m$^3$/min, such as about 10,000 m$^3$/min to about 20,000 m$^3$/min, about 15,000 m$^3$/min. Treated gas, i.e., gas with reduced $CO_2$ content after a chemisorption process in chemisorption reactor 152, may be removed from chemisorption reactor 152 via a conduit. The treated gas may be stored, discarded, or reintroduced to a conduit (and then to chemisorption reactor 152) for further chemisorption. $CO_2$-rich sorbent, i.e., sorbent containing captured $CO_2$, of the chemisorption solution of chemisorption reactor 152 may be flowed via a conduit to heat exchanger 162 to undergo a purely heat-based desorption process. The regenerated amine may be flowed to chemisorption reactor 152 via a conduit, while the desorbed $CO_2$ may be flowed to desorption reactor 166 via a conduit where the desorbed $CO_2$ may then travel to $CO_2$—$H_2O$ separator 170 via a conduit. Additionally or alternatively, the $CO_2$-rich sorbent may be flowed from chemisorption reactor 152 to desorption reactor 166 via one or more conduits without a purely heat-based desorption process by heat exchanger 162. In other words, heat is optionally provided by heat exchanger 162 to the $CO_2$-rich sorbent as it flows through heat exchanger 162.

Once the $CO_2$-rich sorbent is introduced into desorption reactor 166, a desorption process may be performed. A carrier gas along with the $CO_2$-rich sorbent may be introduced into desorption reactor 166 by a conduit (not shown) at a flow rate from about 100 m$^3$/min to about 50,000 m$^3$/min, such as about 10,000 m$^3$/min to about 20,000 m$^3$/min, about 15,000 m$^3$/min. A powdered desorption catalyst may be present in desorption reactor 166 to catalyze the desorption of $CO_2$ from the $CO_2$-rich sorbent introduced into desorption reactor 166 via a conduit. The powdered desorption catalyst may comprise any of the desorption catalysts described herein and may be present in a concentration from about 0.1 g/L to about 500 g/L, about 1 g/L to about 50 g/L, about 1 g/L to about 6 g/L. Desorption reactor 166 may be heated using a furnace or by any other suitable method. Desorption reactor 166 may be heated such that the desorption solution inside the desorption reactor 166 is heated at a temperature from about 25° C. to about 110° C., about 35° C. to about 70° C., about 35° C. Desorbed $CO_2$ may flow from desorption reactor 166 to $CO_2$—$H_2O$ separator 170 via a conduit. $CO_2$—$H_2O$ separator 170 operates as a reflux condenser to condense $H_2O$ and any vaporized sorbent, both of which can then be returned to desorption reactor 166 via a conduit. Meanwhile, desorbed $CO_2$ is removed from apparatus 150 via a conduit. The $CO_2$ may be transferred to a compressor (not shown), such as a storage tank, to be stored for further use, transported, or discarded utilizing any suitable method. Regenerated sorbent, sorbent that has released one or more captured $CO_2$ molecules, may flow from desorption reactor 166 to heat exchanger 162 via a conduit, where the regenerated sorbent may be optionally heated to ensure complete $CO_2$ desorption. Regenerated sorbent may be flowed from heat exchanger 162 to chemisorption reactor 152 via a conduit, where the regenerated sorbent may undergo further $CO_2$ chemisorption processes.

The chemisorption solution in chemisorption reactor 152 may be aqueous. The desorption solution in desorption reactor 166 may also be aqueous. The amount of water of an aqueous chemisorption solution in chemisorption reactor 152 may be from about 1 L to about 1 million kL, about 500 L to about 100,000 kL, about 500 L to about 30,000 kL, about 500 L to about 10,000 kL. The amount of water of an aqueous desporption solution in desorption reactor 166 may be from about 1 L to about 1 million kL, about 500 L to about 100,000 kL, about 500 L to about 30,000 kL, about 500 L to about 10,000 kL.

The above-described apparatus 150 can be controlled by a processor based system controller such a controller 190. For example, the controller 190 may be configured to control apparatus 150 components and processing parameters associated with absorption and desorption processes. The controller 190 includes a programmable central processing unit (CPU) 192 that is operable with a memory 194 and a mass storage device, an input control unit, and a display unit (not shown), such as power supplies, clocks, cache, input/output (I/O) circuits, and the like, coupled to the various components of the apparatus 150 to facilitate control of the substrate processing. The controller 190 also includes hardware for monitoring absorption and desorption processes through sensors in the apparatus 150, including sensors monitoring the various flow rates described herein, stirring rates (if used), compressor 156, $CO_2$ absorption, $CO_2$ desorption, and sensors configured to receive feedback from and controlling said parameters. Other sensors that measure system parameters such as temperature of heat exchanger 162 and the like, may also provide information to the controller 190.

To facilitate control of the apparatus 150 described above, the CPU 192 may be one of any form of general purpose computer processor that can be used in an industrial setting, such as a programmable logic controller (PLC), for controlling various chambers and sub-processors. The memory 194 is coupled to the CPU 192 and the memory 194 is non-transitory and may be one or more of readily available memory such as random access memory (RAM), read only memory (ROM), floppy disk drive, hard disk, or any other form of digital storage, local or remote. Support circuits 196 are coupled to the CPU 192 for supporting the processor in a conventional manner. Implantation and other processes are generally stored in the memory 194, typically as a software routine. The software routine may also be stored and/or executed by a second CPU (not shown) that is remotely located from the hardware being controlled by the CPU 192.

The memory 194 is in the form of computer-readable storage media that contains instructions, that when executed by the CPU 192, facilitates the operation of the apparatus 121. The instructions in the memory 194 are in the form of a program product such as a program that implements the method of the present disclosure. The program code may conform to any one of a number of different programming languages. In one example, the disclosure may be implemented as a program product stored on computer-readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

In one embodiment, a powdered desorption catalyst of formula MOx(OH)y, wherein M=Ti, may be prepared from starting material titanium tetraisopropoxide ($Ti(O-iC_3H_7)_4$) (99 wt. %, Acros) containing 33-35 wt. % $TiO_2$. Titanium tetraisopropoxide ($Ti(O-iC_3H_7)_4$) may be added to DI water with the molar ratio of $H_2O:Ti(O-iC_3H_7)_4$ being 26.3:1, followed by stirring the resultant mixture for about 4 hours. The $TiO_x(OH)_y$ precipitate may be filtered, rinsed about three times with DI water, and then may be partially calcinated at 140° C. for about 4 hours to obtain $Ti_x(OH)_y$. Powderizing may be performed, for example, by mortar and pestle or any other suitable method for forming a powder/industrial pulverizing.

In one embodiment, a powdered desorption catalyst of formula MOx(OH)y, wherein M=Ti, X=1 and Y=2, may be prepared from adding an amount of, for example, Titanium tetraethoxide ($Ti(OC_2H_5)_4$) to deionized water at a molar ratio of $H_2O:Ti(OC_2H_5)_4$ being 26.3:1, followed by stirring the resultant solution for about 4 hours. The precipitate may then be filtered, rinsed with deionized water, and calcinated at 160° C. for about 4 hours to obtain $TiO(OH)_2$ as the major product. Powderizing may be performed, for example, by mortar and pestle or any other suitable method for forming a powder/industrial pulverizing.

Without being bound by theory, desorption of $CO_2$ from, for example, MEA in aqueous solution with $CO_2$, is believed to take place at ambient temperature to near completion with the formation of stable Zwitterionic carbamate ions (as shown below) as an intermediate, formed from the reaction/chelation of the amino substituent of the MEA starting material with $CO_2$.

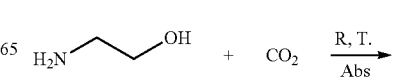

R1

-continued

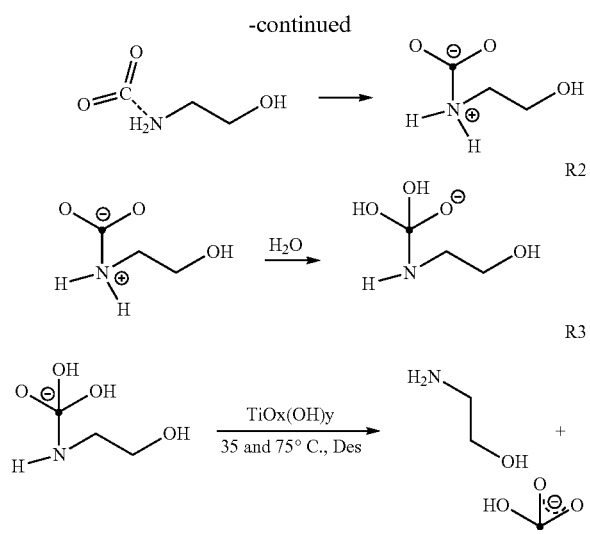

Absorption at ambient temperature is advantageous because energy consumption for industrial scale-up of the absorption can be kept to a minimum. However, for desorption processes, the high stability of the carbamate ions generally requires high, intensive amounts of energy to break the chemical bonding/chelation of the carbamate intermediate, i.e., for the starting material MEA to be regenerated with the full desorption of the captured $CO_2$ (as shown in R3 above). (Ambient temperature is defined herein as the temperature of a reactor without the application of an external heat source to increase or reduce the temperature of a solution inside the reactor.)

Figure 2:
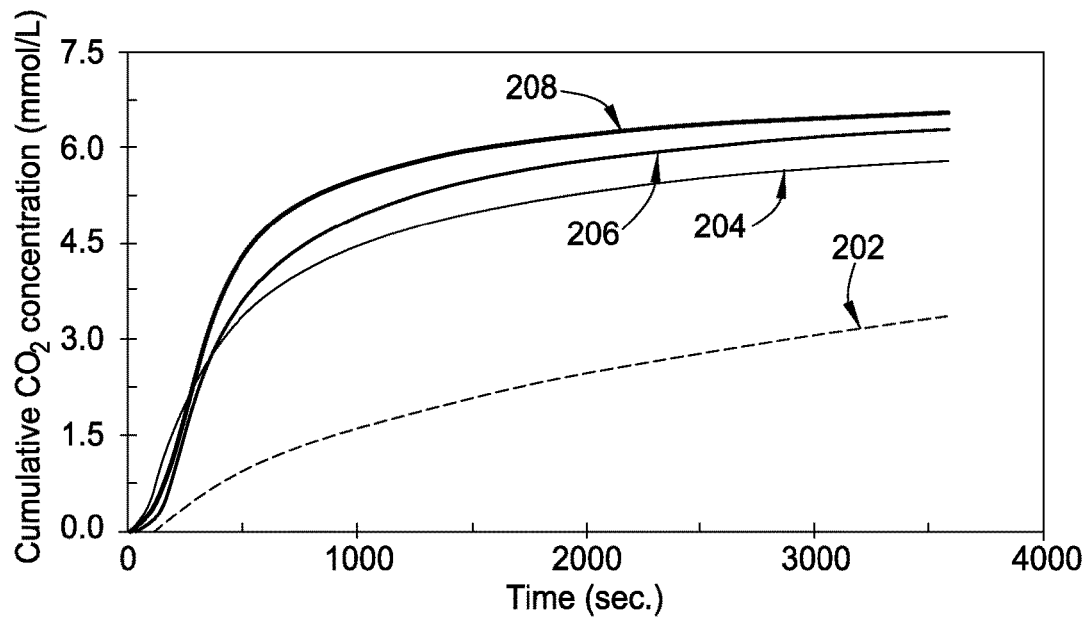
FIG. 2 illustrates the effect of temperature on $CO_2$ desorption process of MEA in the presence and absence of catalyst according to an embodiment.

FIG. 2 illustrates the effect of temperature on a $CO_2$ desorption process of MEA in the presence and absence of catalyst. Reactions were carried out at the following experimental conditions: desorption conditions: 1 L solution volume; 0 and 6 g powdered $TiO(OH)_2$ catalyst weight, 500 mL/min inlet $N_2$ flow rate; 35, 45, 55, and 65° C. temperatures; 500 rpm stirring rate; ~8.2 mM solvent MEA concentration; absorption conditions: 1 L solution volume; 1% $CO_2$ with balance $N_2$ inlet gas; 500 mL/min inlet flow rate; 25° C. temperature; 500 rpm stirring rate; ~8.2 mM solvent MEA concentration. As shown in FIG. 2, uncatalyzed desorption at 35° C. (line 202) desorbs much less $CO_2$ as compared to catalyzed desorption at 35° C. (line 204), catalyzed desorption at 55° C. (line 206), and catalyzed desorption at 65° C. (line 208). Thus, powdered $TiO(OH)_2$ catalyst added to a post-absorption solution (as described above) significantly improves $CO_2$ desorption. Furthermore, the difference in $CO_2$ desorption between uncatalyzed desorption at 35° C. (line 202) and catalyzed desorption at 35° C. (line 204) (in conjunction with the comparatively small difference in $CO_2$ desorption between catalyzed desorption at 35° C. (line 204), catalyzed desorption at 55° C. (line 206), and catalyzed desorption at 65° C. (line 208) indicates that powdered $TiO(OH)_2$ catalyst added to a post-absorption solution may allow industrial scale-up at desorption temperatures at about 35° C. or lower. However, temperatures from about 40° C. to about 110° C., about 40° C. to about 70° C., may also prove to be suitable for industrial scale-up. The lower temperatures for industrial scale-up of the methods described herein lead to energy cost savings compared to desorption processes known in the art. Thus, the methods described herein allow for industrial scale-up with improved economic viability as compared to desorption processes known in the art.

Figure 3:
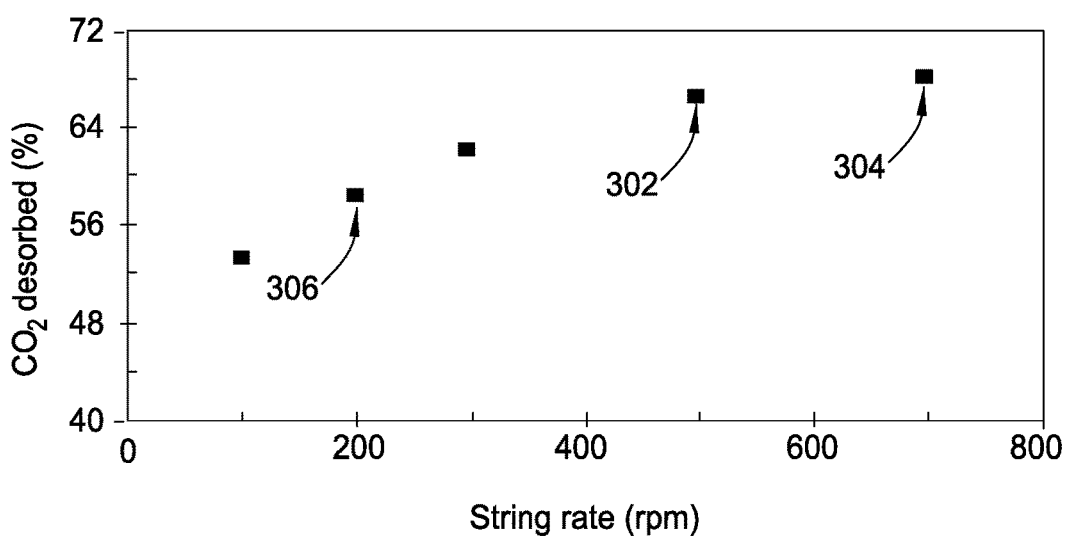
FIG. 3 illustrates calculated amounts of the cumulated $CO_2$ desorbed in percentage (%) for various stirring rates according to an embodiment.
Figure 4:
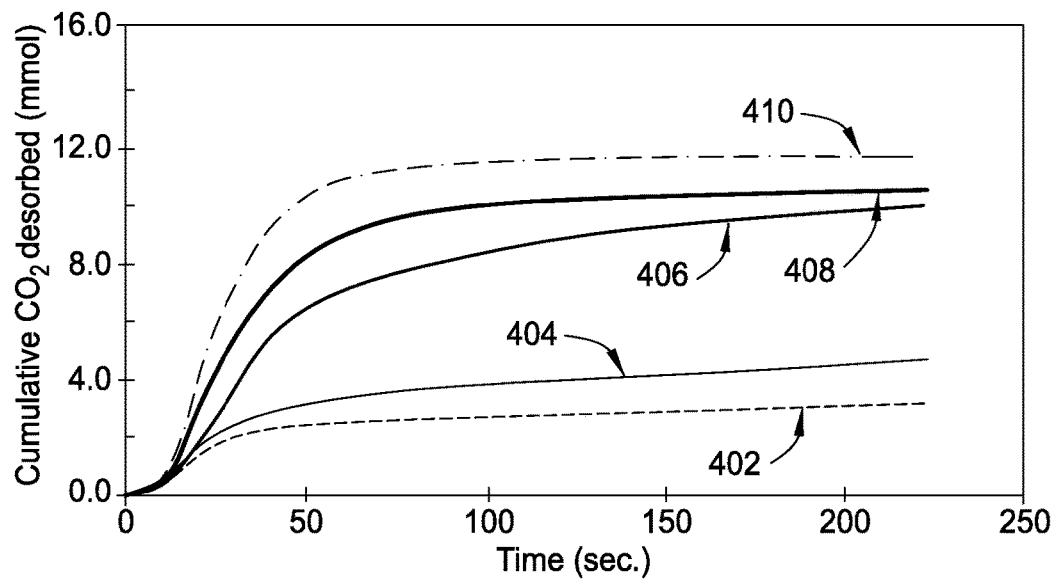
FIG. 4 illustrates the effect of stirring on $CO_2$ desorption according to an embodiment.

The rate of stirring of the powdered catalyst may also affect $CO_2$ desorption. FIG. 3 illustrates calculated amounts of the cumulated $CO_2$ desorbed in percentage (%) for various stirring rates. As shown in FIG. 3, desorbed $CO_2$ at stirring rates of 500 and 700 revolutions per minute (rpm) (data points 302 and 304, respectively) were found to be 66.58 and 68.29%, respectively. Desorption percentages of 66.58 and 68.29% are higher than, for example, desorption under otherwise identical conditions but with a stirring rate of 200 rpm (data point 306). FIG. 4 further illustrates the effect of stirring rate on $CO_2$ desorption. As shown in FIG. 4, stirring during desorption processes with powdered TiO $(OH)_2$ catalyst while stirring at 0 rpm (line 402) and 100 rpm (line 404) results in less $CO_2$ desorption as compared to the desorption processes under otherwise identical conditions but with stirring rates of 300 rpm (line 406), 500 rpm (line 408), and 700 rpm (line 410). It is envisioned that stir rates greater than 700 rpm will similarly result in increased $CO_2$ desorption. The energy cost required for stirring may, however, dictate the stirring rate for a particular industrial scale-up. Nonetheless, stirring rates of about 50 rpm to about 10,000 rpm should be sufficient for industrial scale-up. Experimental conditions for FIG. 3 are as follows: desorption condition (solution volume: 1 L; catalyst weight: 6 g; $N_2$ inlet flow rate: 500 mL/min; temperatures: 35° C.; stirring rates: 100, 200, 300, 500, and 700 rpm; sorbent (MEA) conc.: ~8.2 mM). Absorption condition (solution volume: 1 L; inlet 1% $CO_2$ flow rate: 500 mL/min; temperature: 25° C.; stirring rate: 500 rpm; sorbent (MEA) conc.: ~8.2 mM). Experimental conditions for FIG. 4 are as follows: Desorption conditions (solution volume: 1 L; catalyst weight: 10 g; $N_2$ inlet flow rate: 700 mL/min; temperatures: 35° C.; stirring rates: 0, 100, 300, 500, and 700 rpm; sorbent (MEA) conc.: ~41.2 mM). Absorption condition (solution volume: 1 L; Inlet 1% $CO_2$ flow rate: 500 mL/min; temperature: 25° C.; stirring rate: 500 rpm; sorbent (MEA) conc.: ~41.2 mM).

Figure 5:
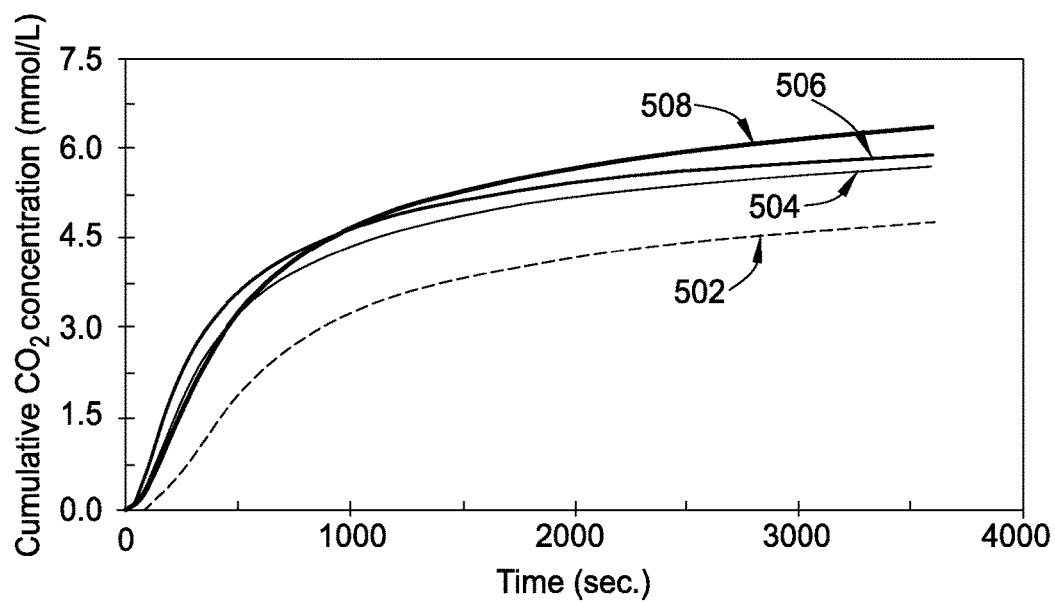
FIG. 5 illustrates the effect of carrier gas flow rates on $CO_2$ desorption according to an embodiment.

The flow rate of carrier gas may also affect $CO_2$ desorption. FIG. 5 illustrates the effect of carrier gas flow rates on $CO_2$ desorption. As shown in FIG. 5, 200 mL/min of $N_2$ carrier gas (line 502) results in less $CO_2$ desorption as compared to each of 400 mL/min of $N_2$ carrier gas (line 504), 600 mL/min of $N_2$ carrier gas (line 506), and 700 mL/min of $N_2$ carrier gas (line 508). Thus, it is feasible to adjust flow rates of a carrier gas in order to optimize $CO_2$ desorption. Flow rates may be from about 1 mL/min to about 10,000 mL/min or greater. It is envisioned, however, that flow rates may be adjusted to conform with the desired flow rates for industrial scale-up of from about 100 m³/min to about 50,000 m³/min, such as about 10,000 m³/min to about 20,000 m³/min, about 15,000 m³/min. For industrial scale-up, flow rates of flue gases may also be adjusted accordingly from about 1,000 m³/min to about 50,000 m³/min, such as about 10,000 m³/min to about 20,000 m³/min, about 15,000 m³/min. Experimental conditions for FIG. 5 are as follows: desorption conditions: 1 L solution volume; 6 g catalyst weight; 200, 400, 500, 600, and 700 mL/min inlet $N_2$ flow rate; 35° C. temperatures; 500 rpm stirring rate; ~8.2 mM solvent MEA concentration; absorption conditions: 1 L solution volume; 1% $CO_2$ with balance $N_2$ inlet gas; 500 mL/min inlet flow rate; 25° C. temperature; 500 rpm stirring rate; ~8.2 mM solvent MEA concentration.

Figure 6:
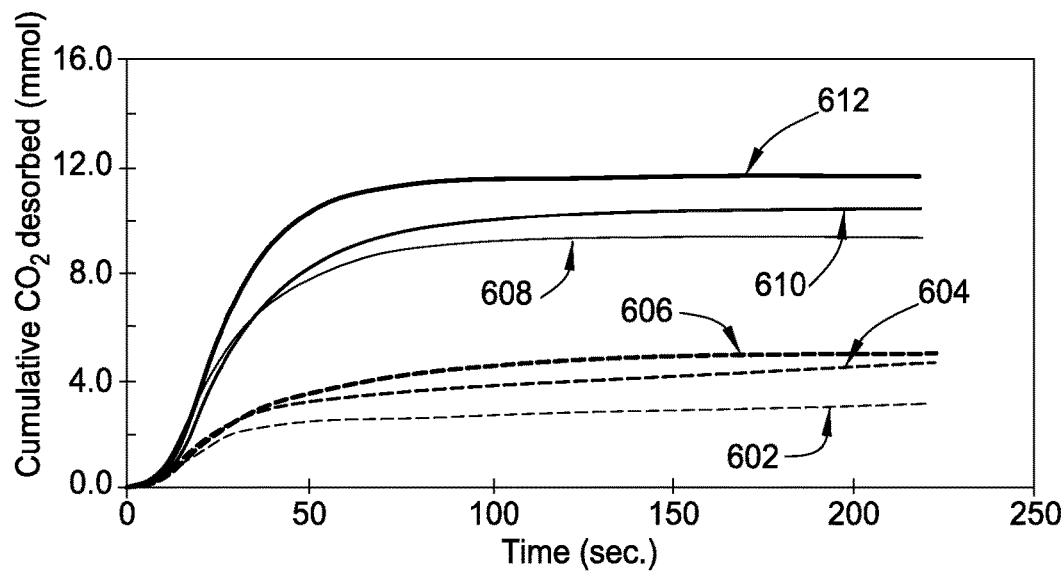
FIG. 6 illustrates $CO_2$ cumulatively desorbed at a desorption temperature of 35° C. using different carrier gases according to an embodiment.

Furthermore, the chemical composition of a carrier gas used in a desorption process may also affect $CO_2$ desorption. FIG. 6 illustrates $CO_2$ cumulatively desorbed ((mmol) versus time) at a desorption temperature of 35° C. using different carrier gases. As shown in FIG. 6, desorption of $CO_2$ using $H_2$ carrier gas but in the absence of powdered TiO(OH)$_2$ catalyst (line 604) desorbs a greater amount of CO$_2$ than the use of N$_2$ as a carrier gas also in the absence of powdered TiO(OH)$_2$ catalyst (line 602). Nonetheless, greater CO$_2$ desorption is observed when CO$_2$ is used as a carrier gas in the absence of powdered TiO(OH)$_2$ catalyst (line 606) as compared to H$_2$ without a powdered TiO(OH)$_2$ catalyst (line 604) and N$_2$ without a powdered TiO(OH)$_2$ catalyst (line 602). As shown in FIG. 6, a similar trend is observed with respect to N$_2$ carrier gas with powdered TiO(OH)$_2$ catalyst (line 608), H$_2$ with powdered TiO(OH)$_2$ catalyst (line 610), and CO$_2$ with powdered TiO(OH)$_2$ catalyst (line 612). Thus, the chemical composition of a carrier gas, or mixture of carrier gases, of a desorption process using a powdered desorption catalyst affects CO$_2$ desorption. It is to be understood that desorption under similar conditions on an industrial scale will be on the order of mol/min to kmol/min, for example from about 50 mol/min to 50,000 kmol/min. Experimental conditions for FIG. 6 are as follows: desorption condition (solution volume: 1 L; catalyst weight: 0 or 30 g; inlet flow rates of carrier gases (H$_2$, N$_2$ and CO$_2$): 500 mL/min; temperature: 35° C.; stirring rate: 500 rpm; sorbent (MEA) conc.: ~41 mM;). Absorption condition (solution volume: 1 L; inlet 1% CO$_2$ flow rate: 500 mL/min; temperature: 25° C.; stirring rate: 500 rpm; sorbent (MEA) conc.: ~41 mM).

Figure 7:
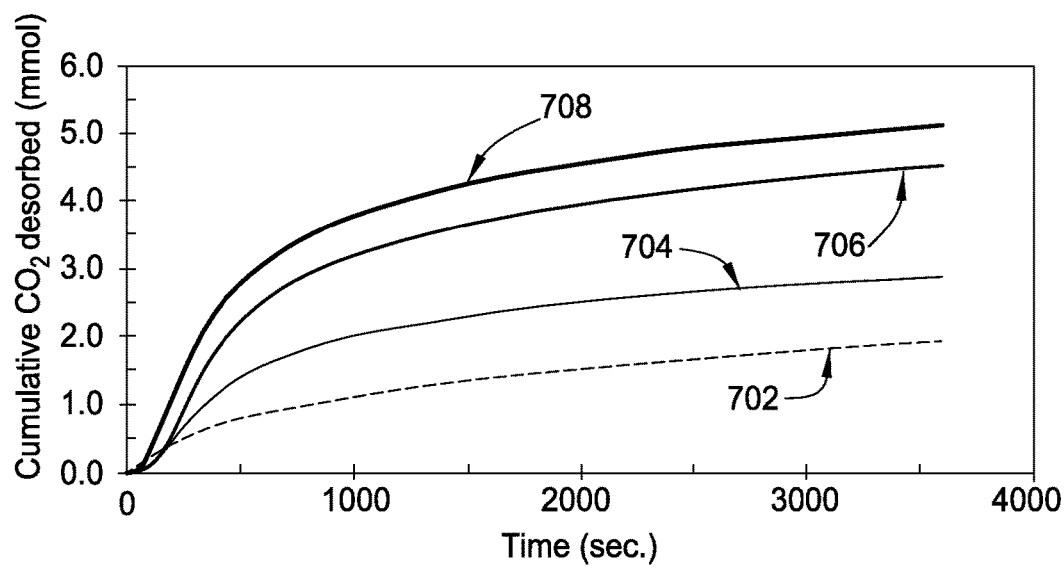
FIG. 7 illustrates the effect of catalyst dosing on $CO_2$ desorption according to an embodiment.

Catalyst dosing may also affect CO$_2$ desorption. FIG. 7 illustrates the effect of catalyst dosing on CO$_2$ desorption. As shown in FIG. 7, uncatalyzed desorption (line 702) results in 2 mmol of CO$_2$ desorption (approximately 24%) whereas desorption of about 6.5 mmol of CO$_2$ (approximately 80%) is observed when desorption is performed in the presence of 6 g/L powdered TiO(OH)$_2$ catalyst (line 708). Desorption performed with 2 g/L powdered TiO(OH)$_2$ catalyst (line 704) and 4 g/L powdered TiO(OH)$_2$ catalyst (line 706) also increases CO$_2$ desorption. It is envisioned that concentrations of catalyst greater than 6 g/L also increase CO$_2$ desorption. It is also advantageous that the CO$_2$ desorption catalyst be in powdered form because the surface area of the CO$_2$ desorption catalyst of a particular amount is greater than the surface area of nanoporous and macroporous absorbent supports of similar chemical formulae and of the same amount, e.g. the catalytic surface area of 1 g of powdered TiO(OH)$_2$ catalyst as compared to the surface area of 1 g of nanoporous or macroporous TiO(OH)$_2$ absorbent support. Furthermore, introducing the CO$_2$ desorption catalyst after the CO$_2$ absorption process may be advantageous because, for example, the CO$_2$ desorption catalyst will not hinder CO$_2$ sorption onto a sorbent during an absorption/adsorption process. Nonetheless, methods described herein may include addition of a CO$_2$ desorption catalyst before or simultaneously with a sorption catalyst. Furthermore, the amount of catalyst may be adjusted depending on the size and other conditions of a particular scale-up, such as sorbent concentration, CO$_2$ concentration, etc. In other words, scale-up of processes described herein may be, but do not have to be, scaled up linearly with respect to examples described herein. Experimental conditions for FIG. 7 are as follows: desorption condition (solution volume: 1 liter; catalyst weights: 0, 2, 4 and 6 g; inlet N$_2$ flow rate: 500 mL/min; temperature: 75° C.; stirring rate: 500 rpm; sorbent (MEA) conc.: ~8.2 mM). Absorption condition (solution volume: 1 L; inlet 1% CO$_2$ flow rate: 500 mL/min; temperature: 25° C.; stirring rate: 500 rpm; sorbent (MEA) conc.: ~8.2 mM).

Methods described herein may involve chemical composition and amounts of one or more powdered desorption catalysts, stirring rates for desorption, and chemical composition and flow rates of one or more carrier gases. Overall, methods described herein allow for enhanced CO$_2$ desorption as compared to desorption and sorption/desorption processes known in the art. Methods described herein further allow for non-interference by the one or more powdered desorption catalysts for CO$_2$ sorption during a sorption process. Methods described herein further allow energy cost savings as compared to desorption and sorption/desorption processes known in the art. Furthermore, methods described herein allow industrial scale-up with improved economic viability as compared to desorption and sorption/desorption processes known in the art. It is also envisioned that methods described herein will further encompass sorption/desorption of gases other than CO$_2$.

While the foregoing is directed to embodiments of the present disclosure, other and further embodiments of the present disclosure may be devised without departing from the basic scope thereof.

The invention claimed is:

1. A method of reducing CO$_2$ from flue gas, comprising:
performing a chemisorption process in a first reactor comprising using at least a chemisorption solution comprising a sorbent; and
performing a desorption process by treating the chemisorption solution with a powdered desorption catalyst after the chemisorption process is performed, wherein the powdered desorption catalyst is of the formula MZ$_v$, wherein M is selected from the group consisting of Ti, Zr, and Hf, wherein Z is selected from the group consisting of —SO$_4$, —F, —Cl, —Br, and —I, and wherein v is a numeral from 1 to 4.

2. The method of claim 1, wherein the desorption process further comprises:
introducing a carrier gas into the first reactor, wherein the carrier gas is selected from the group consisting of N$_2$, He, H$_2$, CO$_2$, Argon and mixtures thereof.

3. The method of claim 2, wherein the flow rate of the carrier gas is about 10,000 m$^3$/min to about 20,000 m$^3$/min.

4. The method of claim 2, wherein the carrier gas is N$_2$ or H$_2$.

5. The method of claim 1, wherein the sorbent comprises an alkanolamine selected from the group consisting of monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol, or mixtures thereof.

6. The method of claim 5, wherein the alkanolamine is monoethanolamine (MEA).

7. The method of claim 1, wherein the desorption process is performed at a temperature of about 35° C. to about 75° C.

8. The method of claim 1, wherein the desorption process is performed with a mechanical stirrer at a stirring rate of about 500 rpm to about 700 rpm.

9. The method of claim 1, wherein the desorption process is performed in a second reactor.

10. A method of reducing CO$_2$ from flue gas, comprising:
performing a chemisorption process in a first reactor comprising using at least a chemisorption solution comprising a sorbent, wherein the chemisorption process is performed at ambient temperature; and performing a desorption process in a second reactor by treating the chemisorption solution with a powdered desorption catalyst, wherein the powdered desorption catalyst is of the formula $MZ_v$, wherein M is selected from the group consisting of Ti, Zr, and Hf, wherein Z is selected from the group consisting of —$SO_4$, —F, —Cl, —Br, and —I, and wherein v is a numeral from 1 to 4, and wherein the desorption process is performed at a temperature from about 35° C. to about 75° C.

* * * * *